Jan. 18, 1966 A. L. SPETZLER 3,229,455
AUTOMATIC REGULATOR ADJUSTING MECHANISM FOR CLOCKS
Filed June 14, 1957 11 Sheets-Sheet 1

INVENTOR
August L. Spetzler
BY
Pennie, Edmonds, Morton, Barrows & Taylor
ATTORNEYS Jan. 18, 1966  A. L. SPETZLER  3,229,455
AUTOMATIC REGULATOR ADJUSTING MECHANISM FOR CLOCKS
Filed June 14, 1957  11 Sheets-Sheet 3

INVENTOR
August L. Spetzler
BY
ATTORNEYS

Jan. 18, 1966   A. L. SPETZLER   3,229,455
AUTOMATIC REGULATOR ADJUSTING MECHANISM FOR CLOCKS
Filed June 14, 1957   11 Sheets-Sheet 5

FIG. 8

INVENTOR
August L. Spetzler
BY
ATTORNEYS

Jan. 18, 1966  A. L. SPETZLER  3,229,455
AUTOMATIC REGULATOR ADJUSTING MECHANISM FOR CLOCKS
Filed June 14, 1957  11 Sheets-Sheet 6

INVENTOR
August L. Spetzler
BY
ATTORNEYS

United States Patent Office 3,229,455
Patented Jan. 18, 1966

3,229,455
AUTOMATIC REGULATOR ADJUSTING
MECHANISM FOR CLOCKS
August L. Spetzler, Peru, Ill., assignor to General Time Corporation, New York, N.Y., a corporation of Delaware
Filed June 14, 1957, Ser. No. 665,810
20 Claims. (Cl. 58—85.5)

This invention relates to the automatic regulation of timepieces and particularly to improvements in that type of automatic regulation wherein, beyond a predetermined small change in setting, or critical correction, of the clock hands, for example, ten minutes, a predetermined small maximum change in the adjustment of the rate regulating mechanism is effected, but wherein for smaller changes in the setting of the hands, the change in adjustment of the regulator is proportional to the hands correction.

The primary object of the present invention is to provide a construction of such automatic regulating mechanism that will be especially suitable for embodiment in clocks, such as automobile clocks, which are provided with some form of power operated means for driving the clock mechanism, and which, consequently, are not required to be wound by hand.

It has been found desirable to provide in such clocks a mechanism for preventing any further change in the regulator adjustment for a predetermined time, for example, one hour, after any change in setting which has involved also a change in the regulator adjustment. The inclusion of such mechanism facilitates the testing and adjustment of the clock mechanism during manufacture, and in addition, renders it impossible for the regulator to be thrown badly out of adjustment by successive changes in the setting of the clock hands as, for example, should a child find the clock an attractive plaything.

Accordingly, another object of the invention is to provide a simple and effective mechanism for disabling the regulation adjustment for a predetermined time after a correction of the hands has been made which has effected a change in adjustment of the regulator.

The longer the period of time that a clock operates before a hands correction of a definite amount is necessary, the smaller the change in regulator adjustment required. Thus, for example, if a particular clock gains ten minutes in twenty-four hours, a considerable change in the adjustment of regulator is required but if the clock runs for a week before gaining ten minutes, a very much smaller change in the regulator should be made.

Accordingly, a further object of the present invention is to provide an automatic adjusting mechanism wherein, after a hands correction which has effected a change in the regulator and during a predetermined time period thereafter, the change in the regulator adjustment which will be made at the next setting will be inversely proportional to the elapsed time between these setting operations. Thus, for example, such a period may be of eight days duration, and the improved mechanism will decrease the amount of regulator adjustment (which would be produced by a hands correction) at regular intervals such, for example, as every twenty-four hours. At the end of the eight day period the amount of regulator adjustment will be at a minimum and it will continue there indefinitely.

Another object of the invention is to provide an automatic regulating mechanism which is of simple construction and has few parts and which, consequently, can be incorporated in a clock mechanism at a minimum increase in the cost of manufacture, and which because of its simplicity, will operate over a long period of time without requiring attention or servicing.

Throughout the specification and claims of this application it will be understood that the term "clock mechanism" includes not only a power operated clock such as an automobile clock, but also a spring wound clock, or, in fact, any form of timepiece, and further it will be understood that this term includes mechanism for driving the hands and the timekeeping mechanism. Furthermore, such mechanism can be of any form desired and suitable to the particular timepiece. It will be further understood that the term "hands" is used to include not only the time-indicating fingers which this term usually connotes, but also any type or form of time-display or time-indicating means or device which may be desired to incorporate in the timepiece.

The invention will be understood from a consideration of the accompanying drawings and the following description of the several embodiments of the improved automatic regulation mechanism illustrated therein.

In these drawings:

FIGS. 8, 9, 10, 11 and 12 illustrate the first modified form of the invention;

FIGS. 13–16 relate to the second modification of the invention;

Referring now to the accompanying drawings, and first to FIGS. 1–7, an inner frame member of the clock is indicated at 1, an outer frame member at 2 and a fragment of a front frame member at 2a. The principal parts of the mechanism are supported on the inner frame member. Thus, a fixed post or shaft 3 is secured in any suitable manner as, for example, by means of a forced fit, in an aperture in the central part of frame 1, and projects forwardly from this frame. Rotatably mounted on shaft 3 is a sleeve 4 which extends from the surface of frame 1 to the outer end of the shaft and, among other things, carries the minute hand 5. The hour hand 6 is secured to the outer end of a considerably shorter sleeve 7 which is slipped over the inner sleeve 4 and bears at its inner end against a stop ring 8 which is sprung around sleeve 4 and seated in a shallow groove.

A shaft 9 from the timekeeping and driving mechanism of the clock (not shown) projects through frame 1 and mounts a driving pinion 10 which meshes with the teeth of the minute gear or wheel 11. It will be understood that the driving mechanism may include an electric motor or other power-operated device, or a power or hand wound spring, and that the timekeeping mechanism may comprise any suitable escape mechanism or its equivalent.

Minute wheel 11 turns freely on the extreme rear portion of sleeve 4 (FIG. 2) and drives this sleeve through a friction spring 12, the parts being held in clamping engagement between the rear face of a pinion 13 and the face of a disk 14 which is secured to the rear end of sleeve 4 by means of a set screw, as indicated. Pinion 13 is fixed to the sleeve. This provides the usual friction drive of the clock hands by the clock driving mechanism which enables the hands to be turned independently of the driving mechanism during setting.

The pinion 13 is part of the reduction gearing that drives hour hand 6 and for this purpose meshes with a large gear 15, the hub 16 of which is fixed to a sleeve shaft 17. This sleeve rotates on a stationary shaft 18 which is mounted at its rear end on frame plate 1. Secured to the outer end of sleeve 17 is a pinion 19 whose teeth mesh with those of the hour gear 20 which is mounted at the rear end of the sleeve 7 that carries the hour hand.

The running rate regulator includes a sector 21 which is pivoted at 22 to frame 1 and is marked with the usual indicators S and F to indicate the direction of movement to cause a decrease or increase in the rate of the clock. Sector 21 is connected to lengthen or shorten the hair spring 23, and for this purpose may be provided with a pin 24 which projects rearwardly from sector 21, and, passing through a curved slot in frame 1, engages the outer coil of the hair spring in the usual manner.

Sector 21 is provided with a series of gear teeth which mesh with the teeth of a pinion 25 forming the hub of a disk shaped member 26. Disk 26 forms a part of the mechanism for adjusting the rate regulator. It is mounted for rotation on a stationary shaft 27 mounted on frame 1. Disk member 26 is made of rubber, or other flexible resilient material, and is secured by rivets or otherwise to a metallic backing plate which provides rigid support for the disk and affords a means of firmly securing it to the pinion-hub member 25. The outer periphery of disk 26 is beveled, as shown at 28, at an angle of about 45° to the disk axis.

The setting knob of the clock is shown at 29 and is fixed to the outer end of a shaft 30 which is mounted for both rotary and axial movement. This shaft is supported in apertures in the respective frame members 1 and 2A. At its rear end there is mounted pinion 31 which is shiftable into and out of engagement with a gear 32, both pinion and gear being arranged at the rear of frame 1. A coil spring 33 on shaft 30 is arranged to urge the shaft rearwardly so that the teeth of pinion 31 and gear 32 are normally disengaged.

Gear 32 (FIG. 2) is fixed to the inner end of a short rotatably mounted shaft which projects through an aperture in frame 1 and which carries at its forward end another gear 34. A double pinion 35 is arranged to rotate on a short stationary shaft 35' which projects forwardly from frame 1, and the teeth of this pinion engage both the gear 34 and gear 15 previously referred to. Thus when setting knob 29 is pulled forwardly so as to engage pinion 31 with gear 32, the gearing which is described imparts rotation through gear 15 to gear or pinion 13 on minute sleeve 4 (turning this sleeve through the friction spring 12 previously referred to) and thence to the clock hands 5 and 6.

The automatic regulator adjusting mechanism is actuated in part by the axial movement of setting knob 29 and in part by its rotary movement. This will be apparent from what follows:

This mechanism includes an actuator in the form of a pointed or sharpened tooth 36 for imparting a limited rotation to disk member 26 during the re-setting movement, or correction, of the hands, a clutch mechanism, indicated generally at 37, for rotatably connecting the tooth 36 with the minute sleeve 4, a disabling member 38 for preventing the engagement of clutch 37 under certain conditions, and a shift lever 39. Lever 39 causes the substantially simultaneous engagement of clutch 37 and of tooth 36 with disk 26, and the simultaneous disengagement thereof, and also actuates disabling member 38, by the axial, or in and out movement, of setting knob 29.

Figure 2:
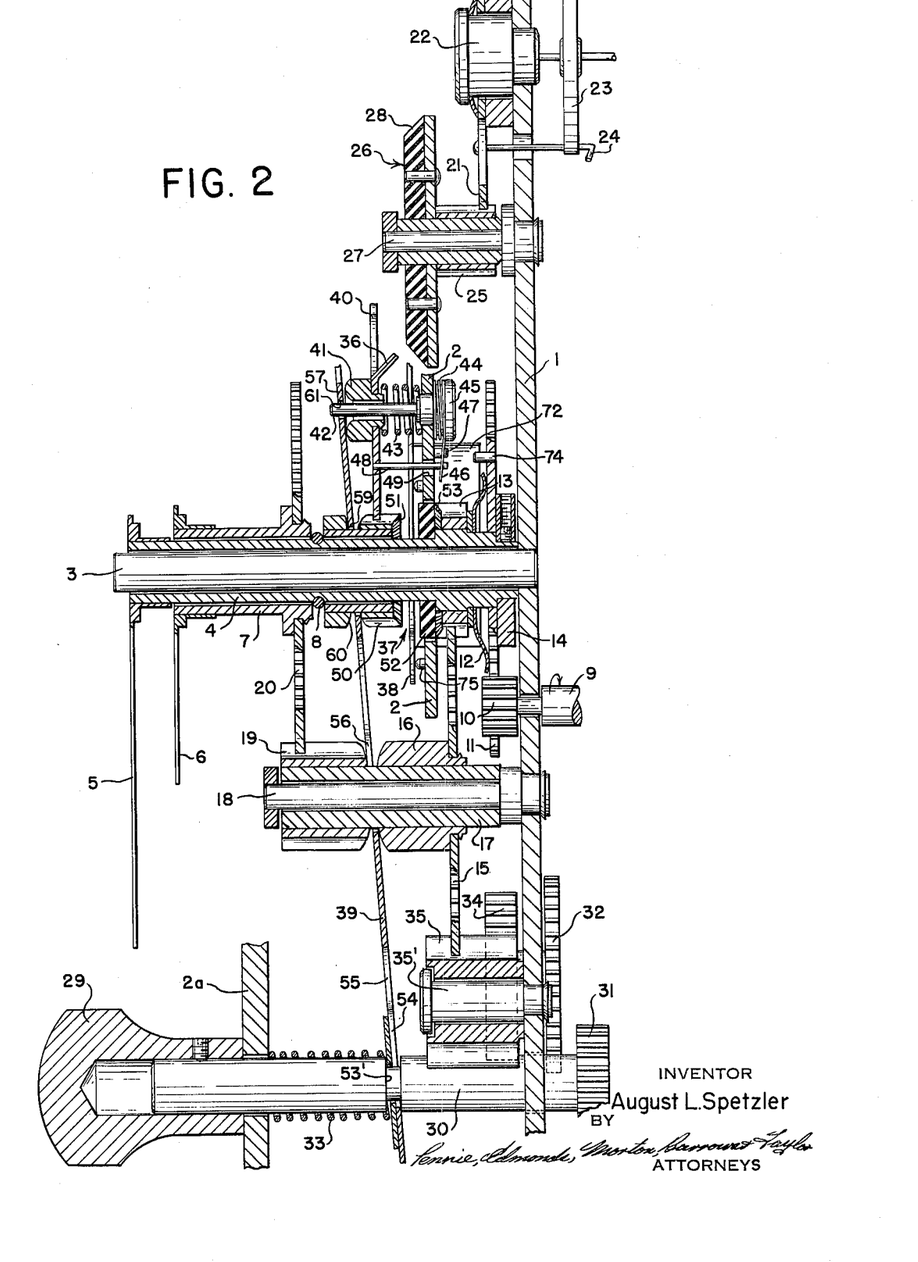
FIG. 2 is a section taken in a generally vertical direction along the broken line 2—2 of FIG. 1, and drawn to the same scale as FIG. 1.
Figure 3:
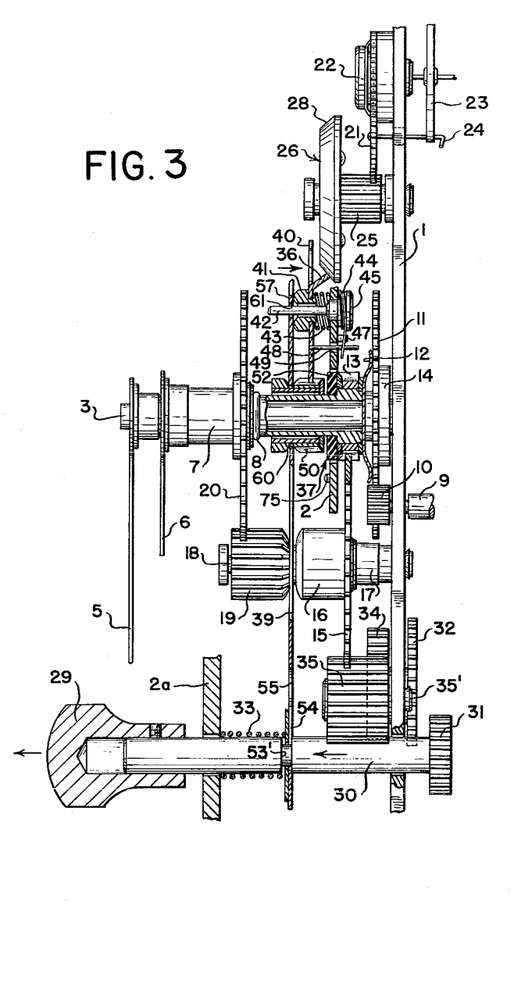
FIGS. 3 and 4, are views similar to FIG. 2, drawn to a smaller scale and showing the parts in positions different from FIG. 2, the parts in FIG. 3 being shown in positions intermediate between those of FIGS. 2 and 4.

The tooth 36 is operatively associated with and, as illustrated, is made integral with, a sector shaped operating gear 40, and tooth 36 is bent downwardly at an angle of about 45° so that when it is shifted to the right (FIG. 2) it engages the bevelled surface 28 of disk 26. Gear sector 40 and tooth 36 are fixed to a hub member 41 that is arranged to be freely slidable and rotatable on a stationary shaft 42 which is mounted at its inner end within an aperture in outer frame member 2. A coil spring 43 urges sector 40 and its tooth 36 outwardly away from disk 26 as shown in FIG. 2.

Figures 1, 1A:
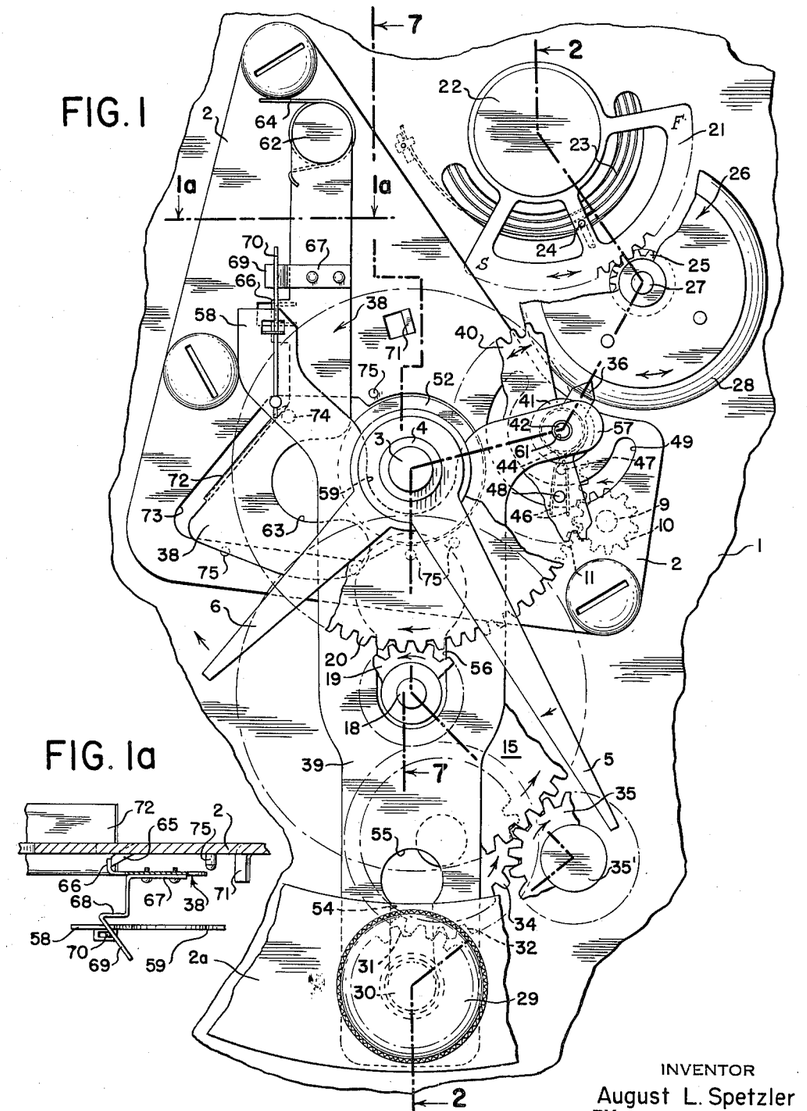
FIG. 1 is a view in front elevation of one form of my automatic regulator adjusting mechanism drawn to a greatly enlarged scale.
FIG. 1a is a detail section on line 1a—1a of FIG. 1.

After a correction of the clock hands 5 and 6 which involves the angular movement of tooth 36 while in engagement with disk 26, it is important to return tooth 36 to its original central position as soon as the clutch 37 is released. At such central position the point of the tooth 36 occupies a position in the straight line joining the axes of shafts 27 and 42 (FIG. 1). The means for returning and holding the tooth 36 in this normal central position comprise a helical spring 44, the body of which is wound several times around a support 45, the two opposite end portions 46 extending downwardly in an approximately radial and parallel spaced relation (FIG. 1). Spring arms 46 engage the opposite sides of a fixed post 47 which projects from the rear surface of frame 2, and serves to hold the spring at all times in a central position.

Arms 46 also engage the opposite sides of a pin 48 which is fixed to gear sector 40 and projects through a semi-circular slot 49 in frame 2. Thus, when gear sector 40 and tooth 36 are displaced from their normal position in either direction one of the spring arms 46 will be deflected, and as soon as the sector 40 is released by clutch 37 such spring arm will return the sector and tooth to central position as determined by the fixed post 47.

To impart turning movement to gear sector 40 a pinion 50 whose teeth engage this gear sector, is mounted on minute sleeve 4 for both rotary and sliding movement and this pinion is connected to sleeve 4 when clutch 37 is engaged. Clutch 37 comprises a set of sharp axially projecting teeth 51 (FIG. 2) which are cut on the rear face of pinion 50 and which, when the pinion is shifted to the right, engage the surface of a flexible resilient collar or washer 52 which may, for example, be of rubber. The rear surface of collar 52 engages the face of pinion 13 which may also be provided with teeth 53 similar to teeth 51. In this way collar 52 is caused to rotate with pinion 13 and minute sleeve 4, or, it might be considered that disk 52 serves to interconnect the teeth on pinions 50 and 13 when pinion 50 is shifted to the right to cause engagement of the clutch.

The shift lever 39 which serves to interconnect the setting knob shaft 30 with the regulator adjusting mechanism, is made of thin flexible material such as spring steel, and its lower end engages a groove 53' in shaft 30. For this purpose lever 39 is provided with a slotted opening 54 having a circular enlargement 55 at its upper portion to permit assembly.

Lever 39 is supported for pivotal movement on sleeve 17 between pinion 19 and hub 16 of gear 15, these two members being mounted in slightly spaced relation and having round faces as shown particularly in FIG. 2. Lever 39 is provided with a second slotted opening 56 which is shaped similarly to slot opening 54 for purpose of assembly over pinion 19.

The upper end of shift lever 39 is forked and terminates in two short and laterally projecting arms 57 and 58 (FIG. 1). The crotch portion 59 between these arms is curved and engages a groove 60 formed in pinion 50 so as to shift the pinion to the right or left as shown in FIG. 2 without interfering with its rotation.

The right hand arm 57 of lever 39 is perforated at 61 to receive the outer portion of stationary shaft 42 and engage the hub 41 of the combined sector 40 and tooth 36 (the rate regulator actuator) for the purpose of moving these parts to the right against the force of coil spring 43 to cause the engagement of tooth 36 with disk 26.

The left-hand arm 58 (FIGS. 1, 5, 6 and 7) of shaft lever 39 actuates the disabling member 38. The purpose of disabling member 38 is to prevent the engagement of clutch 37 under either of two conditions. The first condition is to prevent any change in the adjustment of the rate regulator for a predetermined time after one such adjustment has been made during a correction of the hands. The second is to prevent a change in regulator adjustment merely by shifting the setting knob 29 in and out without making a change in hands setting. This is convenient in testing the clocks during manufacture.

The disabling member 38 is an arm of thin flat metal pivoted at 62 to the upper portion of frame 2 and provided at its lower portion with a lateral U-shaped slot 63. Member 38 is urged to the right by means of a coil spring 64 wound about pivot 62. This spring also urges the lower end inwardly. Disabling member 38 is normally held in the position shown in FIG. 1, that is, the position in which it is disengaged from clutch member 37. To hold it in this position, a lug 65 (FIG. 1a) is struck up from the forward surface of frame member 2, and a catch 66 projects downwardly at the left of member 38 to engage the lug.

The lower end of disabling member 38 when moved to the right causes the marginal portion around the edge of U-shaped opening 63 to enter between teeth 51 and rubber disk 52 of clutch 37 and prevent their engagement. The release of catch 66 to cause this movement is brought about by the outward movement of the setting knob 29, and to this end a shouldered fitting 67 is secured in any convenient manner to the outer surface of lever 39 adjacent the upper end of arm 58 (FIG. 1a). This fitting is provided with a horizontal shoulder 68 and also with a sloping cam surface 69. A spring finger 70 is mounted in any suitable manner on the outer surface of arm 58 and projects beyond it to engage fitting 67.

When the setting knob 29 is pulled out, spring finger 70 slides along the cam surface 69 and slips beneath the lifting shoulder 68. Then, when the setting knob is released, spring finger 70 (FIGS. 1, 1a and 7) acts against shoulder 68 and raises disabling arm 38 and its catch 66, thereby freeing it from the lug 65 so that the spring 64 causes the lower portion of arm 38 to swing to the right and thus disable clutch 37. A stop member 71 in the form of a lug cut and pressed upwardly from frame 2 holds disabling member 38 in the proper position with respect to the parts of clutch 37.

When the disabling arm 38 is in disabling position its rear or inner surface may advantageously be held slightly out of contact with the surface of rubber collar 52. As shown, this support is provided by means of five stationary posts or pins 75 (FIG. 2) which project forwardly from the surface of frame member 2. During the swinging motion of disabling member 38 its rear surface slides upon the rounded outer ends of these posts.

Figures 5, 6, 7:
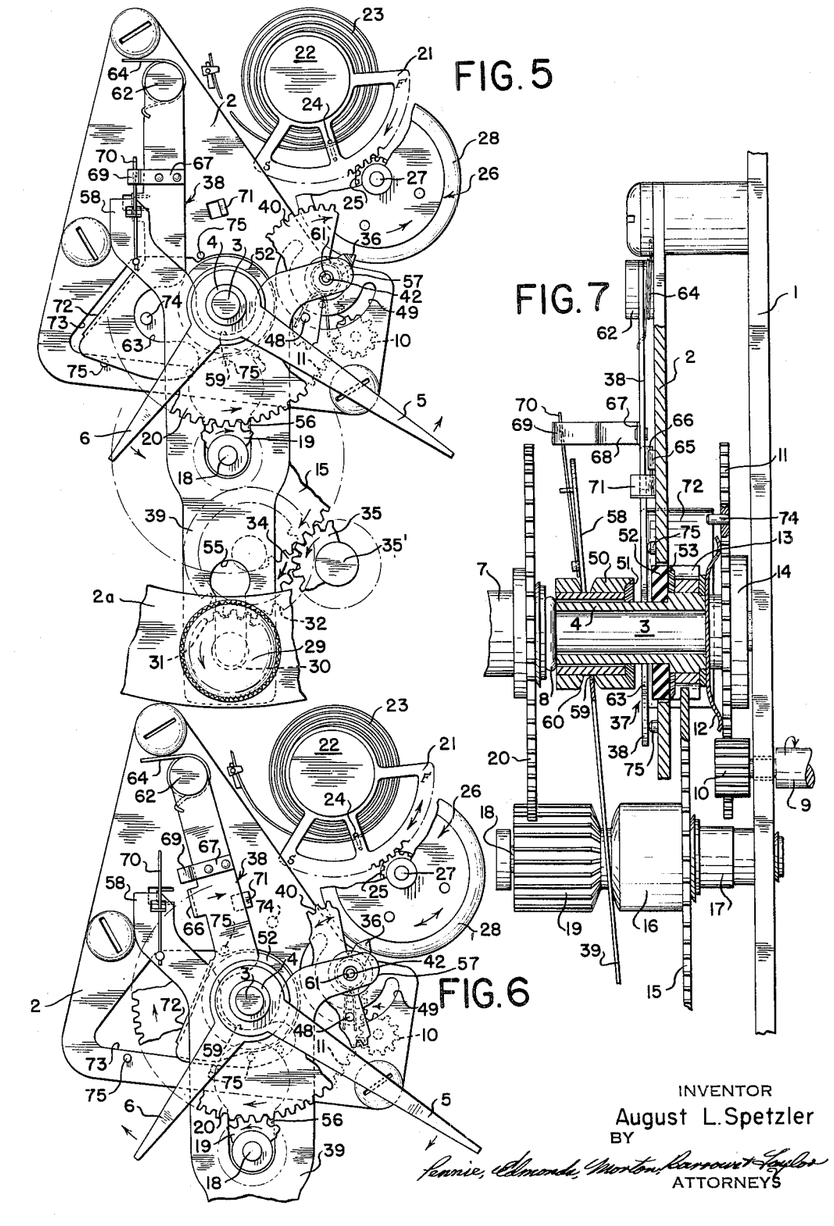
FIG. 5 is a front elevation similar to FIG. 1, but drawn to the same scale as FIGS. 3 and 4, showing the hands reset ten minutes backwards, with the accompanying change in the regulator.
FIG. 6, is a view similar to FIG. 5, but showing the positions of the parts after the setting knob has been released.
FIG. 7, is a view in vertical section drawn to the same enlarged scale as FIG. 2, but taken on broken line 7—7 of FIG. 1.

For the purpose of automatically returning disabling member 38 to its vertical or disengaged position as shown in FIGS. 1 and 5 in order that a subsequent correction of the clock hands may produce further adjustment of the rate regulator, a flange 72 (FIGS. 1 and 7) is formed to project downwardly from the left hand angular edge of member 38, and provides a cam surface. Flange 72 is of considerable width and extends rearwardly or inwardly through an opening 73 in frame 2 into proximity with the minute wheel 11.

A pin or post 74 projects from the surface of the minute wheel and, once during each revolution, that is, once per hour, contacts flange 72 if disabling member 38 is in its engaging position with respect to clutch 37 (FIG. 6). Post 74 engages the inner edge of flange 72 and by a camming action returns member 38 to its vertical or disengaged position (FIG. 1). As member 38 approaches this position catch 66 rides over the sloping surface of lug 65 and then is held by the end of this lug, as previously explained. The action of spring 64 on member 38 urges these two parts into engagement with each other.

Figure 4:
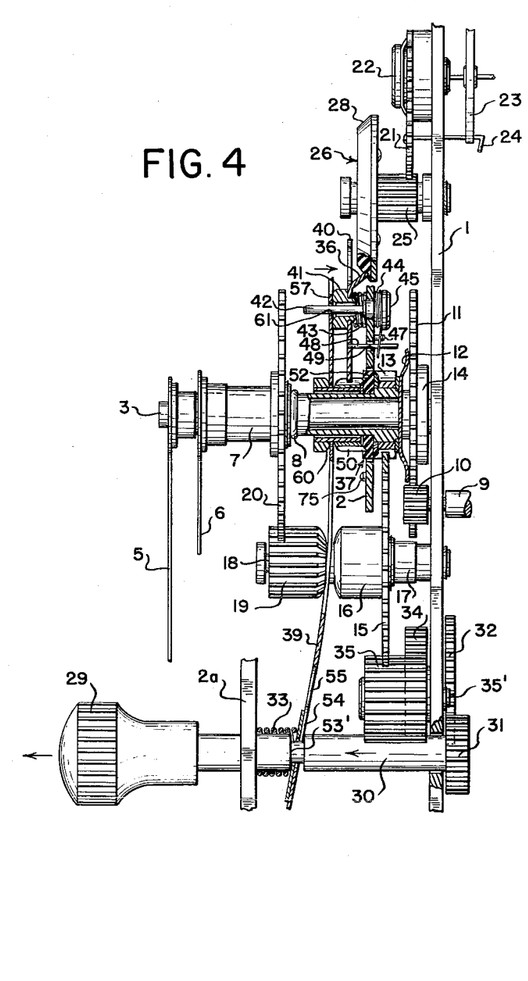

The operation of the automatic regulating mechanism is as follows: Assuming that the clock is fast, and requires that the critical correction of, e.g., 10 minutes be made the hands being in the position shown in FIG. 1, the setting knob 29 is first pulled outwardly from the position shown in FIG. 2 to that shown in FIG. 4. In so doing the parts pass through the position illustrated in FIG. 3, the pivoting movement of shift lever 39 at mid-position being sufficient to cause the tip of sharpened tooth 36 to touch the sloping surface 28 of disk member 26. The continued outward movement causes the meshing of gears 31 and 32 and tensions or bends shift lever 39 as shown in FIG. 4. This forces the point of tooth 36 somewhat into the surface of rubber disk 26 so as to provide firm frictional contact therewith.

The outward movement of setting knob 29 and the resulting pivoting of shift lever 39 also causes the engagement of the clutch 37, shifting pinion 50 axially to the right, and, in additon, causes spring finger 70 to slide along the sloping surface 69 of fitting 67 (FIG. 1A) until it engages beneath the lifting shoulder 68. Finger 70 remains in this position while the correction of the hands is brought about by turning movement of knob 29. This resets the hands backward from the position shown in FIG. 1 to the position shown in FIG. 5.

Such turning of the hands is brought about as previously described through the turning of gears 31, 32, 34, 35, 15 and 13. Simultaneously with the movement of the hands, the rotation of pinion 13 causes, through clutch 37, the rotation of pinion 50 and gear segment 40 thereby moving the sharpened tooth 36 from the position of FIG. 1 to that of FIG. 5. This rotation of tooth 36 causes rotation of disk 26 and consequently of the regulating sector 21 in a direction to shorten the length of the hair spring 23 and thus increase the running rate of the clock.

At the angular position of tooth 36 shown in FIG. 5 it leaves the surface of disk 26 so that no further change in the regulator will be made regardless of the extent of movement of the hands beyond the critical correction. Continued movement of the hands will cause the continued rotation of tooth 36 by its driving sector 40, but no further change in the regulator will be made.

The critical correction is the corrective movement of the hands which has occurred at the time the point of tooth 36 leaves disk 26. In the present embodiment the critical correction is ten minutes, but by changing the length of the tooth 36, or the diameter of disk 26, or both, the critical correction can be reduced, for example, to eight minutes or five minutes, or can be increased, if desired. Any correction of the hands in excess of the critical correction will produce the maximum change in regulator adjustment and no more. However, whenever the change in the setting of the hands is less than the critical amount, the adjustment of the regulator will be proportional to the hand correction.

In the event that the hand correction is begun in the wrong direction and then reversed the amount of adjustment of the regulator will be correctly made provided the incorrect hand setting is less than a predetermined amount, for example, thirty minutes. This is the change in hand setting required for the end of the teeth of sector 40 to be reached by the rotation of pinion 50. Such a predetermined length of time may be in the neighborhood of 30 minutes. If the hands are turned in the wrong direction more than thirty minutes, one end or the other of sector 40 will merely click or snap over the teeth of pinion 50 until the motion of the hands is stopped. Then the reverse movement of the hands while maintaining the setting knob pulled out will cause sector 40 to be rotated in the opposite direction and cancel the movement of disk 26 which took place during the movement of the hands in the wrong direction. The hands correction will have been completed in the right direction, but no change in the adjustment of the regulator will have been accomplished.

Should it be necessary to change the setting of the hands by more than thirty minutes, as for example, in setting the clock after it has been stopped for an extended period of time for any reason, as soon as the hands are turned beyond thirty minutes forward or backward, one end or the other of sector 40 will click over the teeth of pinion 50. However, the instant clutch 37 is released, sector 40 will be free to rotate, and the teeth of sector 40 will immediately remesh with the teeth of pinion 50 because of the pressure of one or the other of the spring arms 46 which returns the sector 40 and tooth 36 to normal or central position.

After the re-setting of hands 5 and 6 has been completed the setting knob 29 is released and coil spring 33 causes the shaft 30 to slide inwardly returning the knob to its orginal position and causing disengagement of pinion 31 from gear 32. This same motion causes the pivoting of shift lever 39 back to its orginal or normal position. During this movement the spring finger 70 pressing against shoulder 68 of fitting 67 lifts disabling member 38 sufficiently to release catch 66 from lug 65 and allow the lower end of the lever to move to the right, causing it to enter between the elements of clutch 37.

Consequently after one hands correction has been completed and the knob 29, released, another hands correction can be made immediately without changing the adjustment of the rate regulator because the elements of clutch 37 are separated from another by the presence of the disabling member 38 between them. No further adjustment of the regulator can accomplish a hands correction until the post 74 on minute wheel 11 has rotated sufficiently to reset disabling member 38 as previously described. The average time for such re-setting is thirty minutes although this time varies between a minimum of about one minute and a maximum of fifty-nine minutes, depending upon the position of post 74 at the time the hands correction was made which resulted in a change in the regulator adjustment. Instead of re-setting member 38 by rotation of the minute wheel it can be reset by the hour wheel 20. In that case the re-setting will occur every 12 hours.

The first modified form of the invention is illustrated in FIGS. 8–12 and is similar to the construction of FIGS. 1–7 aside from the fact that it includes added mechanism which makes (during a definite time period) the adjustment of the regulator inversely proportional to the time elapsed since the preceding hands correction. The longer a clock runs after a re-setting of the hands, the smaller should be the change in adjustment of the regulator and this modification includes regulator adjusting means wherein the degree or amount of adjustment caused by a given hands correction (that is, a given change in setting) is variable and is propressively reduced to a predetermined minimum over a predetermined period of time after each correction of the hands.

In the mechanism shown in FIGS. 8–12, the parts which correspond to those of FIGS. 1–7 have the same reference numerals and the previous description applies. Where the parts in FIGS. 8–12 are somewhat changed but still resemble the corresponding parts in FIGS. 1–7 they are given a subscript "a." Therefore, the following description will relate only to such parts and to the parts which comprise the added mechanism.

The regulator sector 21a, pivot 22a, hair spring 23a, hair spring engaging pin 24a, pinion 25a, actuating disk 26a, stationary shaft 27a, and bevel 28a, all correspond exactly with the similar parts in FIGS. 1–7, but are given the "a" subscripts in order to distinguish them in the description below. This also applies to the sharpened tooth 36a and its supporting gear sector 40a, together with the hub 41a.

In order to provide a variable actuating means for the regulator adjusting disk 26a the sharpened tooth 36a, sector 40a and hub combination is supported in substantially fixed radial position with respect to the supporting shaft 27a a regulator adjusting disk 26a, and the pivot point of this combination is shifted radially to increase or decrease the effective length of tooth 36a. An elongated slot 136 is provided in hub 41a in order to permit such movement. To support sector 40a and tooth 36a in substantially fixed position, hub 41a is centered on the outer end of coil spring 43a the inner end of which is fixed to support 45a.

This allows the sector and tooth to rotate in either direction from the initial central position, and also permits the two-armed spring 46 (FIGS. 8 and 11) to determine such initial position with the point of tooth 36a on the line of centers between shaft 27a and the pivotal center of gear 50 which actuates sector 40a Hub 41a is at all times held in position against the outer end of spring 43a by the inward pressure of lever 39a reacting against the force of the spring.

In order to shift the pivot pin or shaft 42a, as indicated, it is fixed to a lever 140 which extends in a general crosswise direction of the clock mechanism. Lever 140 is positioned at some distance in front of frame member 2 as will be seen in FIG. 11, and is pivoted at 141 by means of a rivet, or otherwise, to the left end of an arm 138 which projects from the outer end of a post 139, these two parts being secured to frame 2 by means of a screw 137 the inner end of which (not shown) is threaded into an aperture in the frame member.

Figure 8:
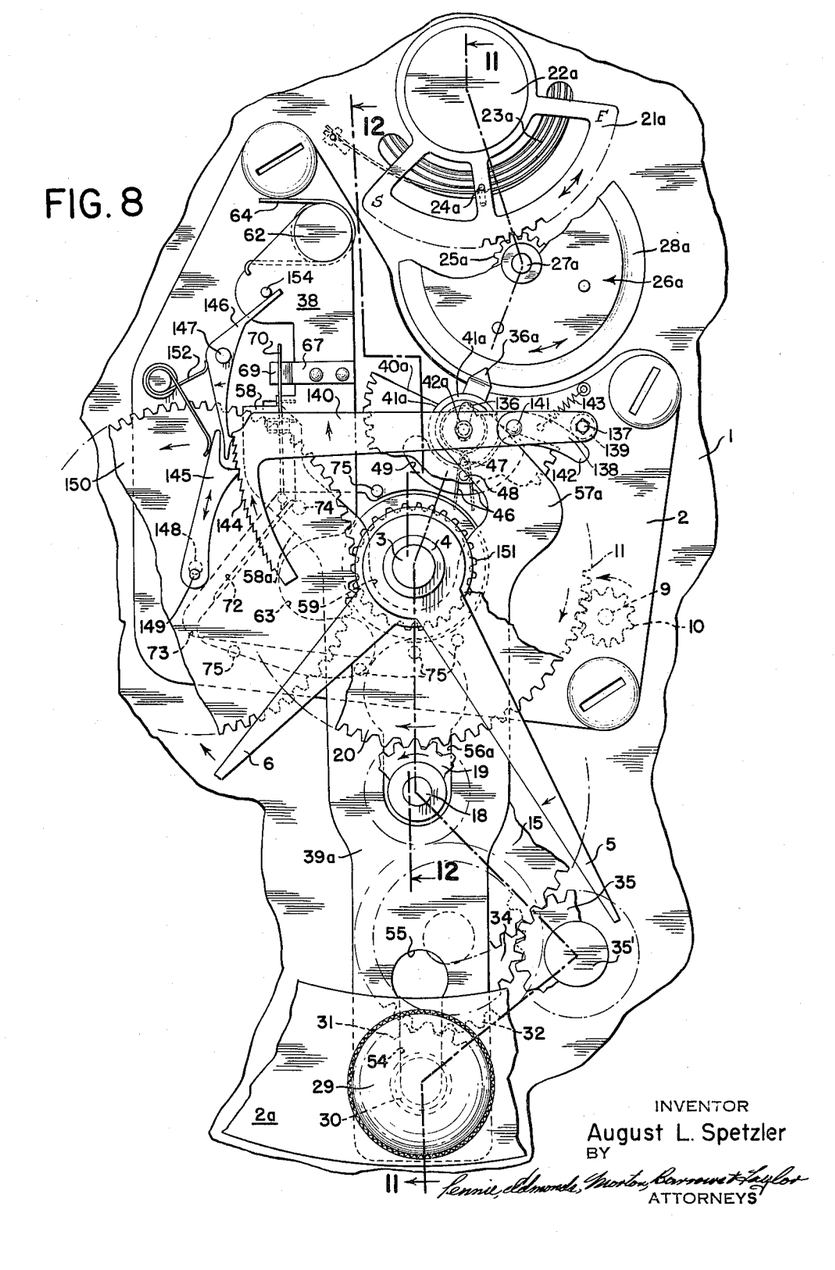
FIG. 8 is a view in front elevation similar to FIG. 1 and drawn to the same scale.
Figure 9:
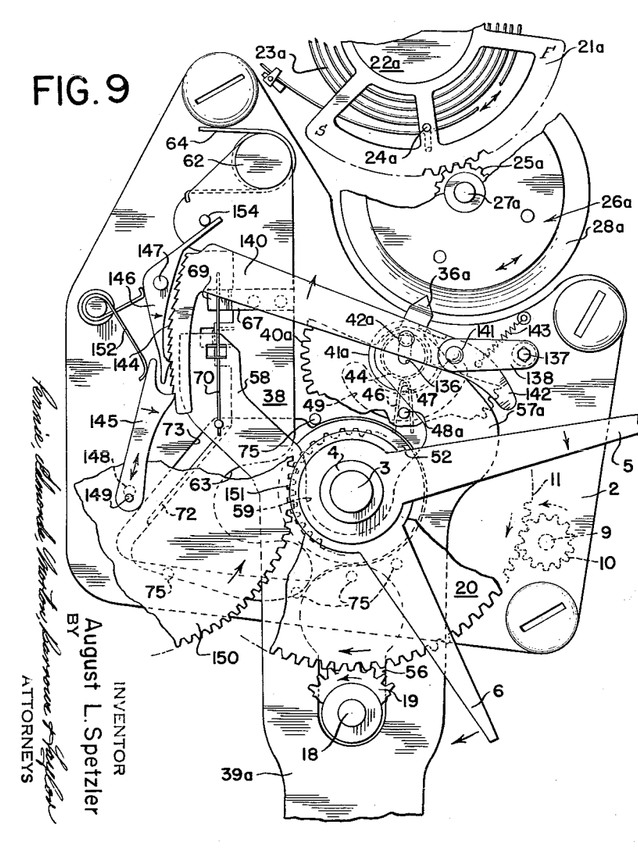
FIG. 9 is a view similar to FIG. 8 showing the parts in different position and with the omission of certain parts.
Figure 10:
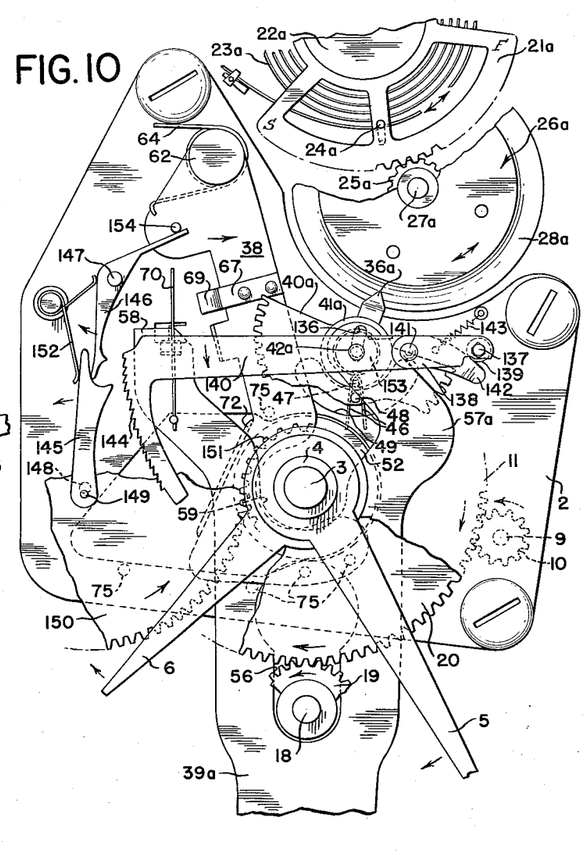
FIG. 10, is a view similar to FIG. 9 with the parts in still other positions.
Figure 11:
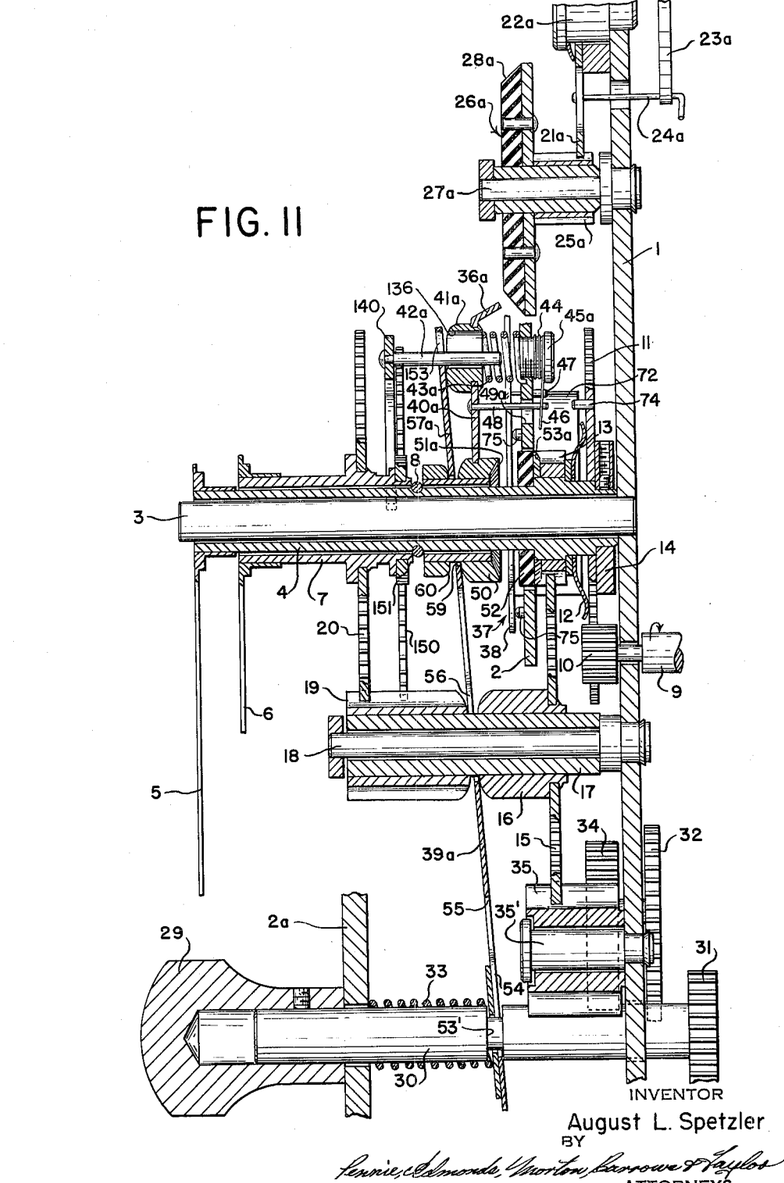
FIG. 11 is a view in vertical section taken on broken line 11—11 of FIG. 8, and is somewhat similar to FIG. 2.

Lever 140 is shiftable from an initial position, shown in FIGS. 8 and 10, where the pivot pin or shaft 42a is adjacent the bottom of slot 136 to a final position shown in FIG. 9, where the pivot shaft is at the top of this slot, shaft 42a being moved bodily between these two positions inasmuch as the outer end of this shaft is fixed to lever 140, as shown, for example, in FIG. 11. Lever 140 at the right of pivot 141 has a short, downwardly curved tail portion 142 which engages post 139 as a stop to limit the downward movement of the left or main portion of the lever. The lever is biased towards this downward position (FIGS. 8 and 10) by its own weight and by means of a tension coil spring 143.

By moving the pivot shaft 42a closer to or farther from the point of sharpened tooth 36a a lesser or greater angular movement will be imparted by this tooth to the regulating adjusting disk 26a for the same angular movement of the tooth.

Lever 140 is actuated by the clock movement, that is, the clock driving mechanism, to progressively swing about its pivot 141 and change the position of shaft 42a so as to decrease the degree or amount of change in the angular movement of the regulator adjusting disk 26a. Thus, the lever is progressively moved from the position of FIG. 8 to that of FIG. 9 over a predetermined period of time, e.g. 12 days. For this purpose the left hand end of lever 140 is provided with a series of ratchet teeth 144 which are arranged to be acted upon by an actuating pawl 145 and a holding pawl 146 (FIGS. 8–10). Holding pawl 146 is pivoted at 147 on frame 2 while actuating pawl 145 is pivoted at its lower end on an eccentric 148 carried by a shaft 149 which supports a gear wheel 150.

This shaft is supported for rotation by frame 2 in any suitable manner and is located at one side of and spaced from the shaft 3 which supports the minute and hour sleeves 4 and 7 respectively. Gear wheel 150 is driven by a smaller gear 151 which is fixed to the hour sleeve 7 (FIG. 11). The operation of the clock movement will cause a slow rotation of the eccentric 148 which will produce a periodic upward movement of actuating pawl 145 that will lift the ratchet 144 by one tooth. Holding pawl 146 will hold the ratchet in such lifted position.

The over-all gear ratio may be arranged so as to require any desired length of time for the progressive actuation of lever 140 from the position of FIG. 8 to that of FIG. 9, for example, a period of eight, twelve, twenty-four, or more days. At the end of such period, if the clock has not been reset, the actuating pawl 145 will have reached the bottom tooth of the ratchet and will thereafter merely slide up and down along the smooth surface below such tooth until the clock is reset. It will be understood that the two ratchets 145 and 146 are spring pressed as, for example, by means of a double spring 152 into engagement with the ratchet.

The resetting of the clock hands at any time will always cause the lever 140 to be returned to starting position, that is, the position shown in FIG. 8, where the extent of the adjustment of the regulator by pointed tooth 36a is maximum.

To make a correction of the hands, the setting knob 29 is manipulated as previously described in connection with FIGS. 1–7. That is to say, the pulling out of the knob actuates shifting lever 39a to move the actuating tooth 36a into contact with the bevel edge 28a of disk 26a (FIG. 11). In this connection, in order to clear the shaft 42a for the hub 41a, a slot 153 (FIG. 11) is formed at the upper end of arm 57a. In FIGS. 8–10 this slot is in line with slot 136. The movement of lever 39a also causes the elements of clutch 37 to engage one another, and the subsequent turning movement of knob 29 is imparted to gear sector 40a and tooth 36a, and these turn on shaft 42a to bring about the turning of disk 26a and the change in the regulator adjustment.

Figure 12:
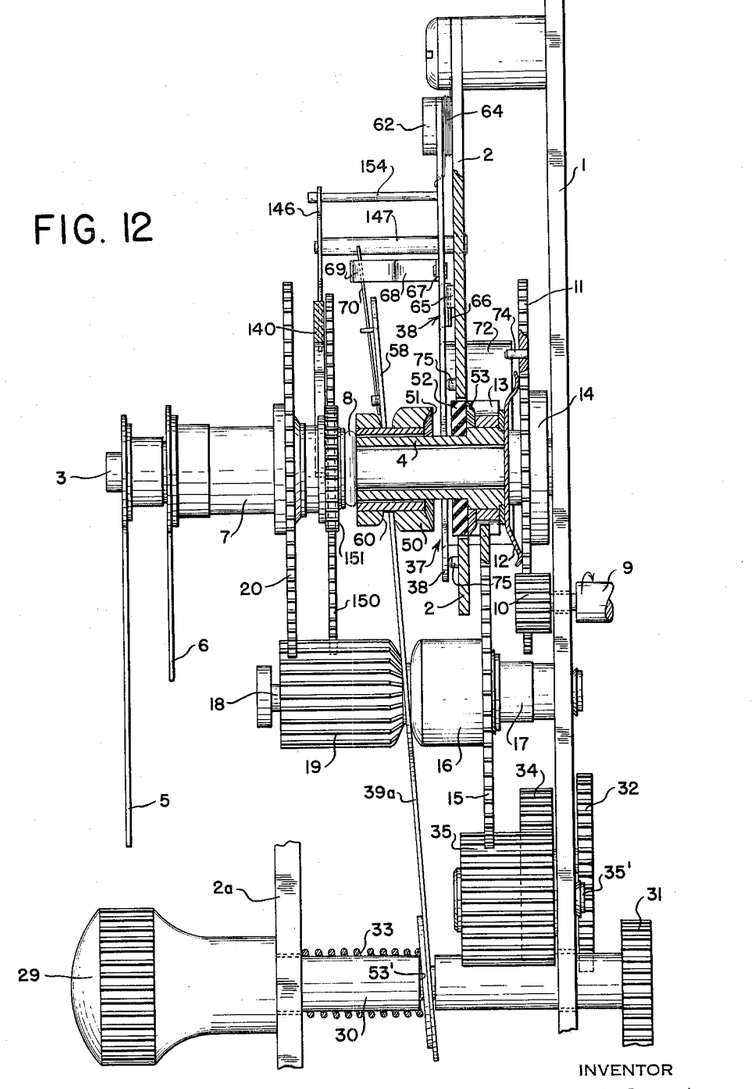
FIG. 12 is a view similar to FIG. 11, the section, however, being taken on line 12—12 of FIG. 8.

The release of knob 29 will allow springs 33 and 43a to move setting shaft 30 to disengage gears 31 and 32, and to return the shift lever 39a and the tooth 36a to their former positions as shown in FIG. 11. The outward movement of the upper end of lever 39a causes spring finger 70, which projects from its upper end, to shift disabling lever 38 outwardly, as in FIGS. 1–7, and disengage it from the holding lug 66 (FIGS. 1a and 12). This allows the disabling lever to swing from the position of FIGS. 8 and 9 to that of FIG. 10, where it acts as a separator between the elements of clutch mechanism 37.

As disabling lever 38 swings to the position of FIG. 10, a pin 154 which projects from the surface of this lever near its pivot 62 strikes the upper end or tail portion of holding pawl 146 and releases the pawl from the teeth 144 of lever 140. The head of pawl 146 also engages a projection on actuating pawl 145 and simultaneously swings this pawl free of teeth 144 (FIG. 10). Spring 143 now swings lever 140 causing the left end carrying the teeth 144 to move downwardly from the position shown in FIG. 9 to that of FIG. 10. This lowers the pivot shaft 42a of the sector 40a and tooth 36a to its initial position, that is, the position shown in FIGS. 8 and 10.

As soon as post 74 (FIG. 12) on minute wheel 11 has rotated to contact flange 72 of disabling lever 38, this lever is swung back to the position of FIG. 8 and this causes the release of pawls 146 and 145 by the return movement of pin 154. The parts are now in position to commence a restart of the shifting movement of lever 140 and the pivot shaft 42a of the regulator adjustment actuating mechanism, and as previously mentioned, lever 140 will be progressively actuated by the pawl 145 to the position of FIG. 9. It will reach this position if no subsequent resetting of the hands takes place until the end of the twelfth day, or other period required for this movement of the lever. Lever 140 will remain in the position of FIG. 9 until such time as a hands correction is made, pawl 145 merely reciprocating idly below the lowest tooth 144, as previously mentioned.

In the embodiment of the invention shown in FIGS. 13, 14, 15 and 16, the automatic regulator adjusting mechanism has been simplified and is especially adapted to be incorporated in an automobile clock. In this modified mechanism the principal frame member is indicated by numeral 85 and an outer frame member by numeral 86. Frame member 86 is supported in spaced relation to frame 85 by means of three leg members 87 which are formed from the same sheet of metal as frame 86 and bent inwardly or rearwardly and secured to posts 88 projecting from frame 85.

Figure 13:
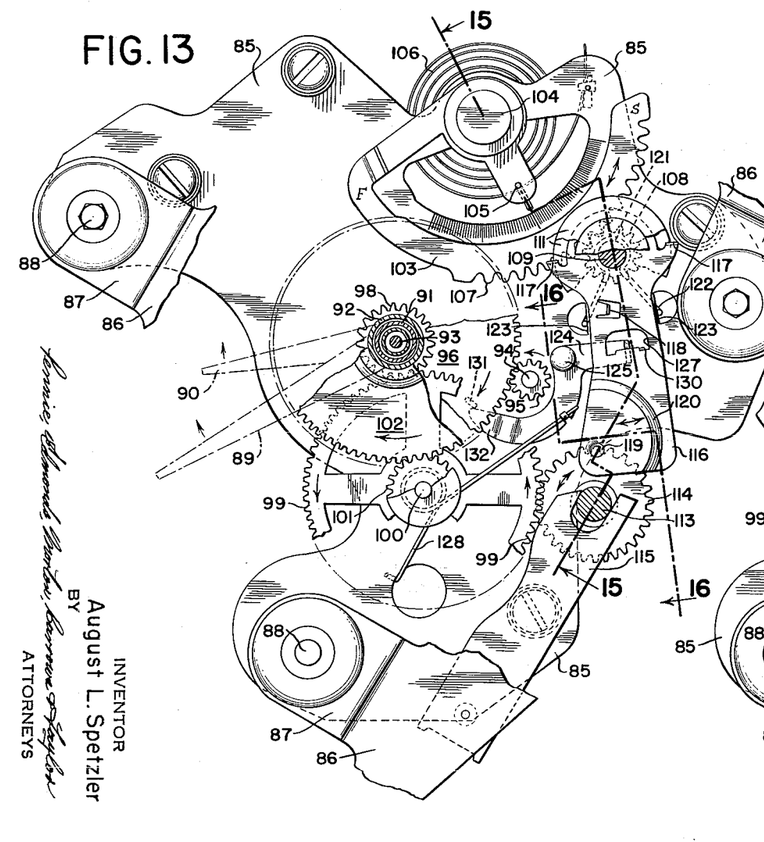
FIG. 13 is a front elevation of a modified form of the automatic regulator adjusting mechanism drawn to an enlarged scale.
Figure 14:
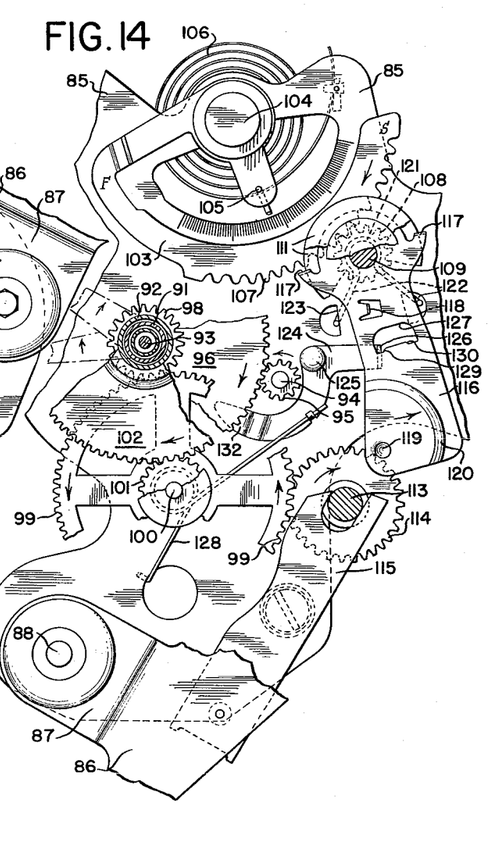
FIG. 14 is a view similar to FIG. 13 with the parts in different position, the hands having been reset forward by the critical amount (10 minutes)
Figures 15, 16:
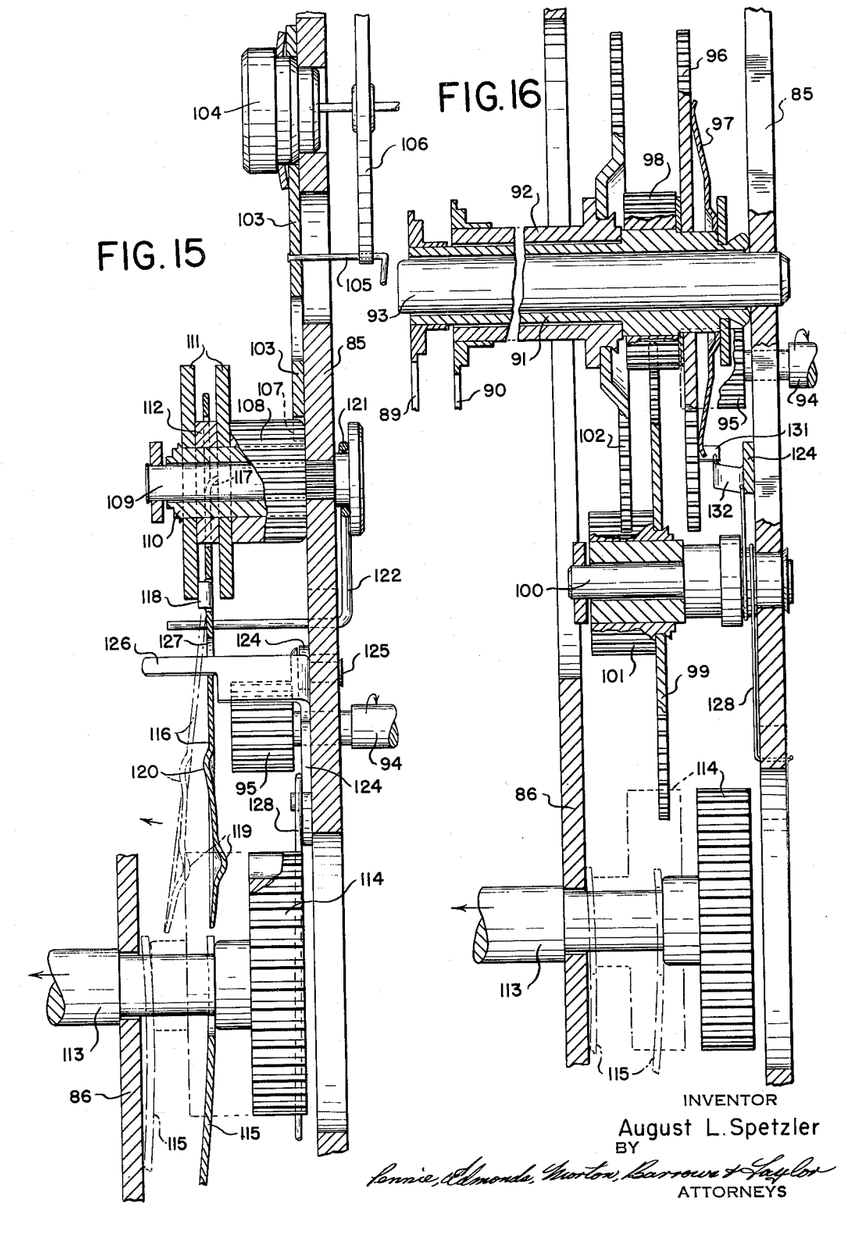
FIG. 15 is a view in vertical section taken on broken line 15—15 of FIG. 13 and drawn to a larger scale.
FIG. 16 is a similar section taken approximately on broken line 16—16 of FIG. 13 to show the drive mechanism for the clock hands.

Referring now to FIGS. 13 and 16 the minute hand 89 and hour hand 90 are secured respectively to an inner sleeve shaft 91 and outer sleeve 92. These sleeves are supported on a stationary shaft 93 which, like shaft 3 of the former construction, is supported by the main frame member 85. Also like the previous construction the drive from the operating motor and timekeeping mechanism of the clock is from a shaft 94 and pinion 95, at its forward end, to minute gear 96, which turns minute sleeve 91 through a friction or slip device provided by a spring disk 97, both of which are arranged at the rear end of sleeve 91.

The drive of the hour sleeve 92 carrying hour hand 90, is through a pinion 98 on the minute sleeve to a gear 99 which rotates on a stationary shaft 100 projecting from frame 85 below shaft 93. A pinion 101 forms the hub of gear 99 and meshes with the hour gear 102 which is fixed to the inner end of the hour sleeve 92.

The regulator is not unlike that previously described and comprises a sector 103 which is pivoted at 104 to frame 85 and carries a pin 105 that projects through an aperture in frame 85 and engages the outermost coil of the hair spring 106. Sector 103 is actuated in either the slow or fast direction by means of gear teeth 107 formed in its outer periphery and which intermesh with the teeth of a pinion 108. This pinion rotates on a short stationary shaft 109 (FIG. 15) projecting from frame 85 and the pinion has a hub 110 of reduced diameter on which two circular disks 111 are securely fixed, these disks being spaced apart by a collar 112 of considerably smaller diameter. These disks form a part of an actuating mechanism by which pinion 108 and regulator sector 103 may be turned a predetermined amount during the setting operation of the clock hands.

The hand setting knob (not shown) is mounted on the forward end of the setting shaft 113. This shaft is mounted in an aperture in front frame member 86 for both rotary and axial or sliding movement. The forward portion of shaft 113 is supported in a cover member forming a part of the instrument panel of the automobile and is also not shown. A pinion 114 is fixed to the inner or rear end of setting shaft 113 and is arranged to mesh with the teeth of gear 99 when the shaft is shifted forward against the action of a flat spring 115 which is mounted on the inner surface of frame 86. The purpose of such spring is to hold the shaft 113 in the normal or inner position where pinion 114 is disengaged from gear 99.

In this modification the shift lever is indicated by 116. This is a flexible resilient member like the shift lever 39 previously described, but lever 116 combines the functions of several of the parts shown in FIGS. 1–7, and for this reason shift lever 116 is mounted to have rotative as well as rocking movement, whereas lever 39 has only a rocking movement. Shift lever 116 itself actuates the rate regulator adjusting mechanism and, in fact, forms part of such mechanism.

Also, instead of actuating a clutch mechanism for disabling the automatic adjusting mechanism, as is the case with shift lever 39, lever 116 constitutes a part of such disabling and such clutch mechanism. Shift lever 116 also constitutes part of the mechanism which limits the adjustment of the rate regulator to a predetermined maximum amount regardless of the fact that the clock hands may be moved considerably beyond the critical amount of ten minutes.

The shift lever 116 is of thin but stiff, flexible resilient steel, or other suitable material. It is mounted on collar 112 between the flat plates 111, and for this purpose has a circular aperture at its upper end to receive this collar, being assembled with plate 111 and collar 112 on the hub 110 of pinion 108. The aperture in lever 116 is a loose fit on collar 112 (FIG. 15) so that the lever may both turn or pivot freely on this collar, and also rock freely on it in the plane of the collar axis, which is also the axis of the hub or sleeve shaft 110 for pinion 108.

Anent such rocking movement the lever is substantially thinner than the collar, and a pair of inwardly turned feet 117 are arranged one on each side of the inner portion of the shift lever and in a plane passing through the center of shaft 109 and of the collar. These feet are formed by bending inwardly two narrow projections at each side of lever 116 so that they will bear against the surface of inner disk 111. These feet, therefore, form a fulcrum on this surface for the rocking movement of the lever. Also when lever 116 is rocked outwardly from the full line position of FIG. 15 to the dotted position, a tongue 118 is forced against the surface of outer disk 111 so that if rotative movement is now imparted to lever 116, the disks 111 and pinion 108 will be rotated and thus adjusting movement will be imparted to regulator sector 103.

Tongue 118 is formed by a combined cutting and stamping operation which first outlines the tongue and then bends it at right angles to the plane of lever 116 so that the edge of the tongue will be in position to engage the flat smooth outer disk 111.

Near the outer end of shift lever 116 (inner surface) is formed a prominence or nose 119 (FIG. 15) which is preferably located at the center of a semi-circular rib 120 the purpose of which is to stiffen the outer portion of the lever. The function of nose 119 is to engage the outer end surface of pinion 114 in an area outside of the root circle of the pinion teeth. In other words, the ends of these teeth frictionally engage nose 119 when setting shaft 113 is moved axially outward, so that when the shaft is turned the rotative movement above referred to will be imparted to shift lever 116.

The outward movement of setting pinion 114 causes both rocking and bending of the shift lever thereby effecting a firm frictional engagement of tongue 118 with the outer disk 111. Consequently, the turning movement of the setting shaft will cause, through the shift lever, a limited turning movement of pinion 108, and this will produce a small angular movement of sector 103, thus, changing the adjustment of the rate regulator.

When the setting knob is released and setting shaft 113 is moved back to its normal position by flat spring 115, the nose of shift lever 116 is released from the side of pinion 114. It now becomes important to return the shift lever to its original central position from which it can be moved in either direction according to whether the pinion 114 is turned to set the clock hands ahead or backwards. A spring 121 is mounted on the rear projection of shaft 109 (FIGS. 13 and 15) having two downwardly projecting arms 122.

The lower portions of arms 122 are bent forward to horizontal position and extend through two semi-circular openings in frame 85 and engage the opposite side edges of shift lever 116. When the lever is at the central position these arms also engage the proximate straight edges 123 of the two semi-circular apertures just referred to. These edges are in line with the side edges of shift lever 116 and thus serve to determine the central position of the shift lever. When the lever is swung in one direction one of the arms 122 is stressed, the opposite arm being held against the edge of its aperture, whereas when the shift lever is swung in the opposite direction, the reverse action takes place.

The disabling of the regulator adjusting mechanism so as to prevent, for a predetermined period of time, a further change in the regulator, following a correction of the clock hands which has produced a regulator adjustment, is accomplished by means of a disabling lever 124 which is pivoted at 125 to frame 85. The body of this lever lies close to the outer surface of frame 85, but has a forward projection at its right end which terminates in a small finger 126. This finger projects through an aperture 127 in shift lever 116 and when the lever is in its central and normal position finger 126 is at the center of this aperture.

A spring member 128 coiled around the hub of shaft 100 which supports gear 99 (FIG. 16), causes finger 126 to be urged against the bottom edge of aperture 127. At the opposite ends of this aperture are two notches forming shoulders 129 and 130. Hence, when shift lever 116 has been shifted sufficiently in one direction by rotation of setting shaft 113, finger 126 will be moved into one of these notches and behind shoulder 129, and when the lever is shifted sufficiently in the opposite direction the finger will be moved into the opposite notch and behind shoulder 130. When behind either of these shoulders shift lever 116 is prevented from returning to its central position.

A critical correction of the clock hands, for example, ten minutes, is involved in causing such a shifting of lever 116. Consequently, if the clock hands are reset to a greater extent than ten minutes either forwards or backwards, the movement of lever 116 is stopped by one end or the other of aperture 127 striking finger 126. This limits the adjustment of the regulator to the predetermined amount. During the continued resetting beyond the critical correction the edges of the teeth of pinion 114 slide beneath the nose 119 on the shift lever.

A second change in the regulator by a further resetting of the hands cannot take place until finger 126 has been lifted to clear shoulder 129 or shoulder 130 and allow lever 116 to center itself.

In order to cause resetting of shift lever 116 at its central position after a maximum change in the regulator adjustment which has caused finger 126 to engage one or the other of the two shoulders 129, 130 a tang or projection 131 on the side of minute wheel 96 is arranged to engage the end of the downwardly curved tail portion 132 of disabling lever 124. Consequently, this lever is shifted once per hour to lift finger 126.

It will be understood that any change in the setting of the clock hands less than the critical correction, that is, one which does not cause the shift lever 116 to be moved sufficiently for finger 126 to engage one or the other of shoulders 129 or 130, will produce a change in the adjustment of the regulator which is proportional to the hands correction.

Figure 17:
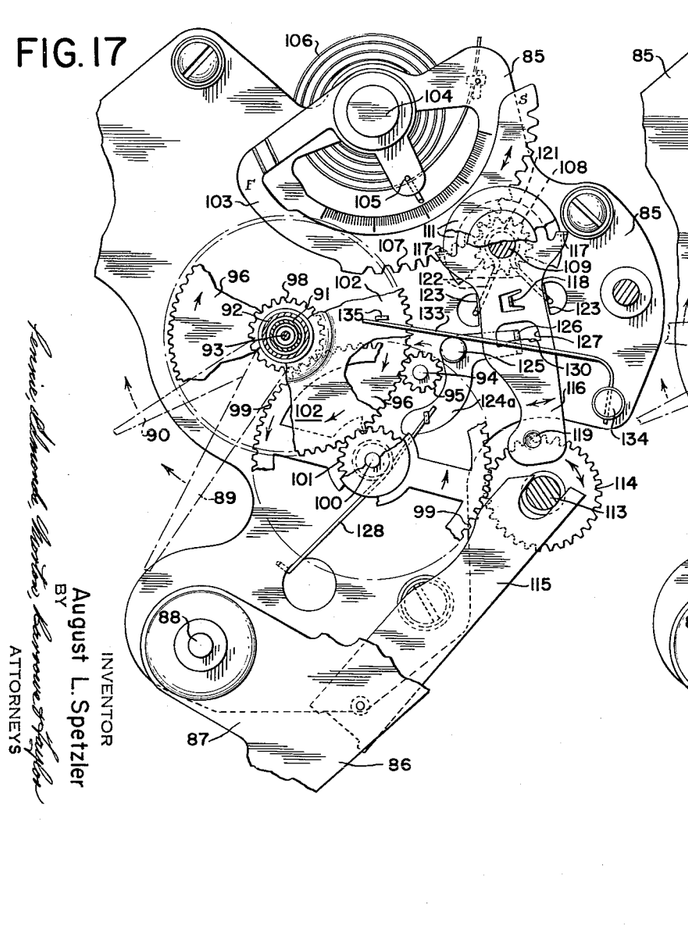
FIG. 17 shows a third modified form of the automatic regulator adjusting mechanism and is a view in elevation similar to FIG. 13.
Figure 18:
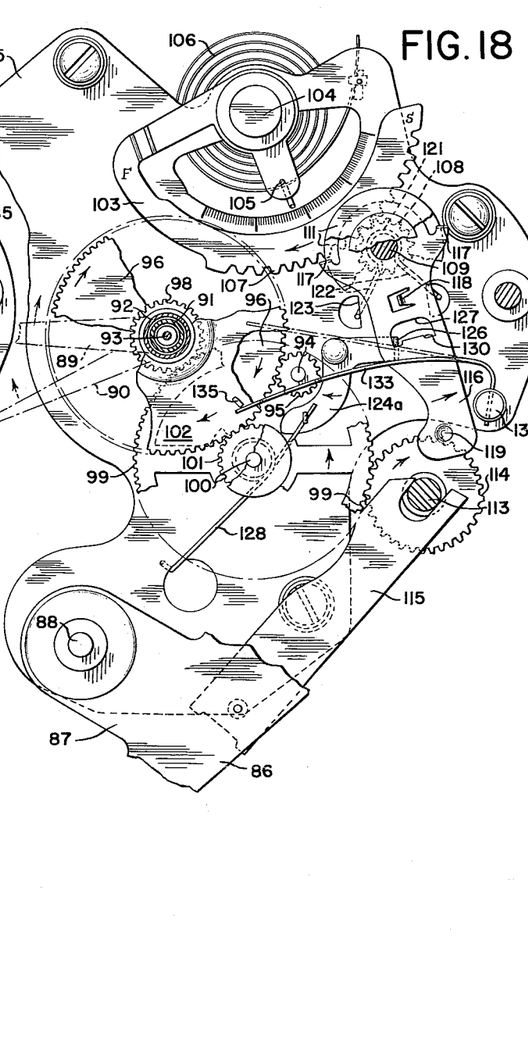
FIG. 18 is a view similar to FIG. 17 with the parts in different position, the clock having been reset forward by the critical amount (10 minutes).

Referring now to FIGS. 17 and 18 which illustrate a third modification, the construction here is in all points similar to construction described in connection with FIGS. 13–16, except for the resetting of the shift lever 116 every twelve hours, instead of once an hour as previously described. Instead of resetting the disabling lever 124A by a projection on the minute wheel 96, which in the former case engaged the tail portion of the disabling lever, such tail portion is eliminated and an elongated spring or spring mounted member 133 is positioned with one end fixed to a post 134 projecting from the side of frame member 85. This spring member is of L-shape and its free end portion passes close to the outer surface of shift level 116 and also in proximity to finger 126 of the disabling lever 124A.

The left end of spring member 133 extends into proximity with the side of the hour gear 102. This gear 102 is provided with a lateral projection 135 which, in its rotation, engages the outer end portion of spring member 133, bending the spring member downwardly as shown in FIG. 18. As the projection 135 passes beyond the end of spring 133, the spring snaps upwardly and strikes finger 126 lifting it free of whichever shoulder 129 or 130 with which it may have been engaged. Thus the disabling member 124A is lifted once every twelve hours.

The invention has been set forth in connection with several embodiments and it will be understood that further modifications thereof may be made which come within the scope of the appended claims.

I claim:

1. In a clock, a movement including a rate regulator, hands driven by said movement, setting mechanism for said hands, means for actuating said regulator, coupling means interconnecting said setting mechanism and said actuating means so as to change the regulator adjustment when the hands are set, means for engaging and disengaging said coupling means, a disabling device for said coupling means, and means for actuating said device to prevent re-engagement of said coupling means for a predetermined time after a setting movement which has effected a change in the regulator adjustment.

2. In a clock, a movement including a rate regulator, hands driven by said movements, setting mechanism for said hands, means for actuating said regulator, coupling means interconnecting said setting mechanism and said actuating means so as to change the regulator adjustment when the hands are set, a disabling device for said coupling means, said setting mechanism including a setting member axially shiftable into and out of operative connection with the setting mechanism, means actuated by said setting member during movement into said operative connection for causing engagement of said coupling means, and means actuated by said setting member during movement of said member out of said operative connection for causing said disabling device to move to disabling position to prevent re-engagement of said coupling means by a subsequent operation of said setting member.

3. A clock as set forth in claim 2 wherein the coupling means comprises two axially relatively shiftable members and the disabling device is a blade-like member which is disposed between said relatively shiftable members when in disabling position.

4. In a clock, a movement including a rate regulator, hands driven by said movement, setting mechanism for said hands, means for actuating said regulator, coupling means interconnecting said setting mechanism and said actuating means so as to change the regulator adjustment when the hands are set, said coupling means comprising a pair of axially relatively shiftable members, means for shifting such members into and out of engagement with each other, a blade-like disabling device pivotally mounted to swing between said axially shiftable members to prevent the engagement thereof, said blade-like member being biased towards said disabling position, means for latching said blade-like member in non-disabling position, and manually operated means for releasing said latch.

5. In a clock, a movement including a rate regulator, hands driven by said movement, setting mechanism for said hands, means for actuating said regulator, coupling means interconnecting said setting mechanism and said actuating means so as to change the regulator adjustment when the hands are set, said coupling means comprising a pair of axially relatively shiftable members, means for shifting such members into and out of engagement with each other, a blade-like disabling device pivotally mounted to swing between said axially shiftable members to prevent the engagement thereof, said blade-like member being biased towards said disabling position, means for latching said blade-like member in non-disabling position, said setting mechanism including a setting member axially shiftable into and out of operative connection with the setting mechanism, and means actuated by said setting member for releasing said latch when said setting member is shifted out of said operative connection thus allowing said blade-like disabling member to enter between said coupling members to prevent re-engagement thereof.

6. In a clock, a movement including a rate regulator, hands driven by said movement, setting mechanism for said hands, means for actuating said regulator and means interconnecting said setting mechanism and said actuating means so as to change the regulator adjustment when the hands are set, said actuating means comprising parallel coacting members mounted for rotation about parallel axes, and brought into coaction by relative axial movement, the coacting members maintaining their parallel relationship during said axial movement, one of said members having a radial projection for engaging the other member and moving out of such engagement when the hands have been set forward or backward a predetermined amount so as to limit the amount of adjustment of the regulator.

7. A clock as set forth in claim 6 wherein one of said coacting members is a disk having a bevelled edge, and the other of said members is a pointed finger which engages the bevelled edge of the other member when said members are in coacting position.

8. In a clock, a movement including a rate regulator, hands driven by said movement, setting mechanism for said hands, a rotatable setting member axially shiftable into and out of operative connection with the setting mechanism, means for actuating said regulator, and means interconnecting said setting mechanism and said actuating means so as to change the regulator adjustment when the hands are set, said actuating means comprising coacting parallel members mounted for rotation about parallel axes and brought into coaction by relative axial movement, the coacting members maintaining their parallel relationship during said axial movement, said setting member being connected to axially shift one of said coacting members with respect to the other, one of said coacting members having a radial projection for engaging the other member and rotating out of such engagement when the hands have been set forward or backward a predetermined amount.

9. In a clock, a movement including a rate regulator, hands driven by said movement, setting mechanism for said hands, said mechanism including a gear, and means for actuating said regulator comprising two coacting parallel members mounted for rotation about parallel axes and brought into coaction by relative axial movement, the coacting members maintaining their parallel relationship during said axial movement, the actuating member of said coacting members comprising a gear sector having a finger projecting radially therefrom to engage the other member and moving out of such engagement when the hands have been set forward or backward a predetermined amount, the said gear meshing with the teeth of said sector to cause the change in the regulator adjustment when the hands are set.

10. In a clock, a movement including a rate regulator, hands driven by said movement, setting mechanism for said hands, said regulator having actuating means operated by said setting mechanism, said actuating means including mechanism for varying the degree of change in said regulator for a given change in hands setting, and mechanism operated by the clock movement for operating said last named mechanism to progressively reduce the degree of adjustment of said regulator from an initial maximum to a predetermined minimum throughout a predetermined time period after each setting of the hands.

11. A clock as set forth in claim 10 and in, addition, means operated by the setting mechanism following each setting of the hands for restoring the mechanism for varying the degree of change to produce the maximum degree of regulator adjustment.

12. In a clock, a movement including a rate regulator, hands driven by said movement, setting mechanism for said hands, said regulator having actuating means operated by said setting mechanism, said actuating means including mechanism for varying the degree of change in said regulator for a given change in hands setting, and mechanism operated by the clock movement during a predetermined time period after each setting of the hands for reducing in proportion to the time elapsed during such period the degree of adjustment of said regulator.

13. A clock as set forth in claim 12 and, in addition, means operated by the setting mechanism following each setting of the hands for restoring the mechanism for reducing the degree of adjustment of the regulator to produce the maximum degree of regulator adjustment.

14. In a clock, a movement including a rate regulator, hands driven by said movement, setting mechanism for said hands, means for actuating said regulator, and means interconnecting said setting mechanism and said actuating means so as to change the regulator adjustment when the hands are set, said actuating means comprising coacting members mounted for rotation about parallel axes and brought into coaction by relative axial movement, one of said members having a projection engaging the other member and moving out of such engagement when the hands have been set forward or backward a predetermined amount so as to limit the amount of adjustment of the rate regulator, pivot means for each of said coacting members, said means being relatively movable toward and away from each other, means operated by the clock movement for progressively increasing the separation of said pivots from a given initial separation so as to reduce the degree of change in said regulator for a given change in hands setting, and means operated by the setting mechanism for restoring the initial separation of said pivots whenever a hands setting is made.

15. In a clock, a movement including a rate regulator, hands driven by said movement, setting mechanism for said hands, means for actuating said regulator, coupling means interconnecting said setting mechanism and said actuating means so as to change the regulator adjustment when the hands are set, means operated by the setting mechanism for engaging and disengaging said coupling means, a disabling device for said coupling means, means for actuating said device to prevent reengagement of said coupling means for a predetermined time after a setting movement which has effected a change in the regulator adjustment, said actuating means including mechanism for varying the degree of change in the regulator for a given change in hands setting, mechanism operated by the clock movement during a predetermined time period after each correction of the hands for reducing the initial degree of regulator adjustment in proportion to the time elapsed during such period, and means for returning said last named mechanism to position to produce the initial degree of regulator adjustment, said mechanism being actuated by the disabling device as it moves to disabling position.

16. In a clock, a movement including a rate regulator, hands driven by said movement, setting mechanism for said hands, means for actuating said regulator, coupling means interconnecting said setting mechanism and said actuating means so as to change the regulator adjustment when the hands are set, said setting mechanism including a rotatable setting member axially shiftable into and out of operative connection with the setting mechanism, a disabling device for said coupling means movable into and out of disabling position, and means for actuating said disabling device into disabling position operated by said setting member during its movement out of operating position with respect to the setting mechanism.

17. A clock as set forth in claim 16 including means for moving the disabling device out of disabling position after a predetermined time.

18. A clock as set forth in claim 1 including means operated by said hands-setting mechanism for engaging and disengaging said coupling means.

19. A clock as set forth in claim 14 including mechanism operated by the clock movement for progressively increasing the separation of said pivots from a given initial separation to a predetermined maximum separation within a predetermined time.

20. A device for automatic and simultaneous regulation of the escapement hair spring of a clock in connection with the setting of the hands of said clock comprising a rotatable adjusting shaft for setting the hands of said clock and carrying a first engaging means, regulating means for said hair spring, driving means operatively engaging said regulating means and carrying a second engaging means, coupling means positioned between said first engaging means and said second engaging means to couple the two when said adjusting shaft is operated, and means for holding said coupling means out of coupling position between said first and said second engaging means for a predetermined lapse of time after an initial operation of said adjusting shaft.

References Cited by the Examiner
UNITED STATES PATENTS 2,542,430   2/1951   Rabinow ___________ 58—109
2,941,349   6/1960   Lux _______________ 58—109

FOREIGN PATENTS 552,055   11/1956   Italy.

LEO SMILOW, *Primary Examiner.*
JOSEPH P. STRIZAK, *Examiner.*

UNITED STATES PATENT OFFICE
CERTIFICATE OF CORRECTION

Patent No. 3,229,455                          January 18, 1966

August L. Spetzler

It is hereby certified that error appears in the above numbered patent requiring correction and that the said Letters Patent should read as corrected below.

Column 4, line 11, for "turnin gthis" read -- turning this --; column 8, line 12, for "propressively" read -- progressively --; line 35, for "a regulator" read -- of regulator --.

Signed and sealed this 10th day of January 1967.

(SEAL)
Attest:

ERNEST W. SWIDER                           EDWARD J. BRENNER
Attesting Officer                                Commissioner of Patents